Patented July 9, 1946

2,403,791

UNITED STATES PATENT OFFICE 2,403,791

INTERPOLYMERS OF A METHYLENE MALONIC ESTER AND AN UNSATURATED ALKYD RESIN

Gaetano F. D'Alelio, Pittsfield, Mass., assignor to General Electric Company, a corporation of New York No Drawing. Original application November 16, 1939, Serial No. 304,783, now Patent No. 2,330,033, dated September 21, 1943. Divided and this application April 30, 1943, Serial No. 485,178

17 Claims. (Cl. 260—42)

This application is a division of my copending application Serial No. 304,783, filed November 16, 1939 now Patent No. 2,330,033, issued September 21, 1943, and assigned to the same assignee as the present invention.

This invention relates to the production of organic plastic masses having valuable and characteristic properties that make them especially suitable for use in industry, for example in molding, laminating, casting, coating and adhesive applications, and for other purposes. The invention is concerned more particularly with compositions of matter comprising an interpolymer (copolymer) of ingredients comprising a methylene malonic ester and another polymerizable organic compound, specifically a polymerizable unsaturated alkyd resin obtained by reaction of ingredients comprising a polyhydric alcohol and an alpha unsaturated alpha beta polycarboxylic acid.

The invention claimed in my parent application Serial No. 304,783 is based on my discovery that improved yields of methylene malonic esters, more particularly yields of the order of 30 per cent and higher, can be obtained by reacting (condensing) a malonic ester with formaldehyde in the ratio of one mol of the former to at least one mol of the latter and under alkaline conditions to form a methylol derivative, acidifying the mass, dehydrating the acidified mass to obtain a composition comprising a methylene malonic ester, and separating the methylene malonic ester, as by distillation, from the said composition. The general reaction may be written graphically as follows:

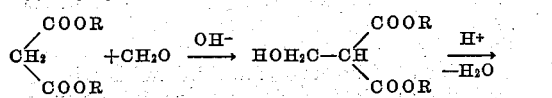

or, with a molecular excess of formaldehyde,

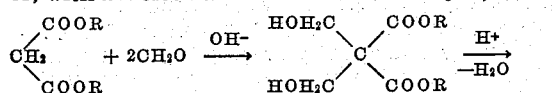

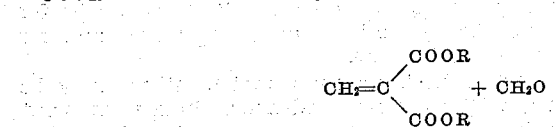

In the above equations R represents an aliphatic or aromatic hydrocarbon radical such as methyl, ethyl, propyl, isopropyl, butyl, amyl, hexyl, octyl, allyl, methallyl, crotyl, phenyl, cyclohexyl, methoxyethyl, etc.

By the above method I have been able to obtain not only methylene dimethyl and methylene diethyl malonates, but also other esters of methylene malonic acid. These esters are useful not only in themselves but I have found that they are particularly adapted for the production of new and useful copolymers.

Illustrative examples of some of the methylene malonic esters that may be prepared and used in practicing the present invention are methylene dimethyl malonate, methylene diethyl malonate, methylene dipropyl malonate, methylene di-isopropyl malonate, methylene dibutyl malonate, methylene di-(secondary amyl) malonate, methylene di-(secondary butyl carbinyl) malonate, methylene di-(diethyl carbinyl) malonate, etc. Other examples will be apparent from the illustrative examples of radicals that R in the above formulas may represent.

Illustrative examples of some of the malonic esters, many of which are new, which I have prepared and which may be reacted with formaldehyde as above briefly described to obtain substantial yields of the corresponding methylene malonic esters are:

| Malonic ester | Boiling point at °C. |
|---|---|
| Methyl malonate | 181. |
| Ethyl malonate | 198. |
| Propyl malonate | 98.5–99 at 4 mm. pressure. |
| Isopropyl malonate | 93–95 at 12 mm. pressure. |
| Butyl malonate | 128–133 at 5.5 mm. pressure. |
| Secondary amyl malonate | 106–109 at 1 mm. pressure. |
| 2-ethyl butyl malonate | 129–137 at 2.5 mm. pressure. |
| Hexyl malonate | 160–166 at 6 mm. pressure. |
| Methyl isobutyl carbinyl malonate | 123–137 at 4 mm. pressure. |
| Octyl malonate | 188–193 at 4.5 mm. pressure. |
| Allyl malonate | 118–122 at 10 mm. pressure. |
| Alpha-ethyl hexyl malonate | 160–195 at 4.5 mm. pressure. |
| Isobutyl carbinyl malonate | 143–146 at 4 mm. pressure. |
| Secondary butyl carbinyl malonate | 142–149 at 3.5 mm. pressure. |
| Diethyl carbinyl malonate | 129–135 at 4 mm. pressure. |
| Methyl propyl carbinyl malonate | 119–123 at 4 mm. pressure. |
| Ethoxy ethyl malonate | 145–149 at 4.5 mm. pressure. |
| Butoxy ethyl malonate | 165–170 at 4.5 mm. pressure. |
| Methoxy ethyl malonate | 129.5–130 at 2 mm. pressure. |
| Methoxy diethylene glycyl malonate | 190–205 at 1.5 mm. pressure. |
| Ethoxy diethylene glycyl malonate | 180–187 at 2.0 mm. pressure. |
| Butoxy diethylene glycyl malonate | 200–222 at 1.5 mm. pressure. |

The methylene malonic esters have boiling points only slightly higher than the corresponding malonic esters, and differ therefrom only within about a 10-degree range.

In producing the organic plastic masses of this invention heat, light, or heat and light may be used to effect polymerization, although under such conditions the rate of polymerization is relatively slow. Hence, to accelerate the polymerization, I prefer to use a catalyst, accompanied by heat, light, or heat and light. Examples of catalysts that may be used are oxygen, ozone, hydrogen peroxide, sulfuric acid, aluminum chloride, boron fluoride, superoxides such as aliphatic acyl peroxides, e. g., acetyl peroxide, stearyl peroxide, etc., peroxides of the aromatic acid series, e. g., benzoyl peroxide, etc. Benzoyl peroxide is the preferred catalyst because of its ease of handling, its relative freedom from explosive hazards and its ready solubility in the monomeric or partially polymerized methylene malonic esters. The rate of polymerization is a function of the temperature and may be carried out at from room temperature (20°–30° C.) to temperatures materially above 100° C., for example about 130° C.

In order that those skilled in the art better may understand how the present invention may be carried into effect, the following illustrative examples are given. All parts are by weight.

*Example 1*

| | Parts |
|---|---|
| Methylene dibutyl malonate | 20 |
| Polyhydric alcohol ester of an alpha unsaturated alpha beta polycarboxylic acid [1] | 80 |
| Benzoyl peroxide | 1 |

[1] Note:—This polyhydric alcohol ester was prepared by effecting reaction between equal molar parts of maleic anhydride and diethylene glycol. The reactants were mixed in a suitable apparatus and the temperature raised to 200° C. over a period of one hour. Heating was continued for six hours at 200° to 210° C., at the end of which period of time there was obtained a viscous, pourable resin having an acid number of about 27.

The methylene dibutyl malonate was copolymerized with the above-described polyhydric alcohol ester at 90° C., yielding a soft gel at the end of 40 minutes and a hard copolymer within two hours. This copolymer was exceptionally hard and abrasion-resistant after heating for a total of 17 hours at 90° C.

*Example 2*

| | Parts |
|---|---|
| Methylene di-isopropyl malonate | 20 |
| Diethylene glycol maleate prepared as described under Example 1 | 80 |
| Benzoyl peroxide | 1 | were treated at 90° C. for 1 hour and 50 minutes to give a soft, gel-like copolymer. Continued heating for 17 hours at 90° C. gave a hard copolymer.

*Example 3*

| | Parts |
|---|---|
| Methylene di-(secondary amyl) malonate | 20 |
| Diethylene glycol maleate prepared as described under Example 1 | 80 |
| Benzoyl peroxide | 1 | were heated together at 90° C. for 17 hours to give a hard copolymer.

*Example 4*

| | Parts |
|---|---|
| Methylene dihexyl malonate | 20 |
| Diethylene glycol maleate prepared as described under Example 1 | 80 |
| Benzoyl peroxide | 1 | were heated at 90° C. for 40 minutes to give a soft gel that became hard within two hours. When heated at 90° C. for 17 hours, it was exceptionally hard.

*Example 5*

| | Parts |
|---|---|
| Methylene di-(secondary butyl carbinyl) malonate | 20 |
| Diethylene glycol maleate prepared as described under Example 1 | 80 |
| Benzoyl peroxide | 1 | were heated for 2 hours at 90° C. to give a soft gel, which became a hard copolymer after 17 hours.

*Example 6*

| | Parts |
|---|---|
| Methylene (diethyl carbinyl) malonate | 20 |
| Diethylene glycol maleate prepared as described under Example 1 | 80 |
| Benzoyl peroxide | 1 | were heated for 1 hour and 5 minutes at 90° C. to give a soft gel. When heated for 17 hours at 90° C. a hard copolymer was formed.

Illustrative examples of other polyhydric alcohol esters of alpha unsaturated alpha beta polycarboxylic acids that may be copolymerized with methylene malonic esters to provide new and useful organic plastic masses are: ethylene glycol maleate, triethylene glycol maleate, glyceryl maleate, ethylene glycol fumarate, diethylene glycol fumarate, triethylene glycol fumarate, propylene glycol fumarate, glycol itaconate, diethylene glycol itaconate, triethylene glycol itaconate, tetraethylene glycol itaconate, glyceryl itaconate or modifications of these esters produced by incorporating therein nonethylenic polybasic acids such as the saturated aliphatic acids, e. g., malonic, succinic, glutaric, adipic, pimelic, suberic, sebacic, etc., the aromatic polybasic acids, such as phthalic, di-, tetra- and hexa-hydrophthalic, naphthaline dicarboxylic, etc., or mixtures of such acids.

The interpolymers obtained by copolymerizing methylene malonic esters with other polymerizable bodies have a wide range of properties. Their hardness and solubilities may be varied over a considerable range from fluid compositions of varied intrinsic viscosity or soft, flexible bodies to hard, rigid masses that can be swelled or dissolved in many volatile and non-volatile solvents, even those of a hydrocarbon nature. By suitable selection of the starting monomeric or partly polymerized materials, interpolymers can be obtained in an insoluble, infusible state practically resistant to the destructive effect of other chemical bodies such as acids, bases, solvents and the like.

The methylene malonic esters may be converted into the form of interpolymers in molds with or without the application of pressure, in the presence or absence of a material which is a solvent for the monomer but not for the polymer, or one which is a solvent for both monomer and polymer, or one which is not a solvent for either the monomer or polymer so that spongy or granulated polymeric modifications are obtained.

The solid, thermoplastic copolymers of this invention, with or without modifying agents, may be used in injection, compression or transfer molding processes to make numerous articles for industrial, technical and novelty uses and for other applications.

As modifying agents various fillers may be used, for example wood flour, alpha flock, sand, asbestos, mica, paper, cloth, cellulose derivatives such as cellulose itself, cellulose ethers, natural and synthetic filaments or fibers, etc., in continuous, shredded or comminuted form. Pigments, dyes, opacifiers, plasticizing substances such as dibutyl phthalate, esters of monobasic and polybasic acids, etc., may be incorporated into the copolymers of this invention to modify the same. Natural and synthetic resins, gums, oils, waxes, polyhalogenated aromatic derivatives, etc., likewise may be added as modifying agents.

In a solvent, or without a solvent utilizing a melt process, the fusible or soluble compositions may be used in adhesive and laminating applications to bond paper, wood, mica flakes, glass sheets, rubber sheets, etc., fibrous materials such as silk, asbestos, glass fibers, synthetic fibers in filament, thread or fabric (woven or felted) form, etc., cellulose derivatives in sheet, comminuted or fiber form, etc. In the form of liquid coating compositions such as lacquers, enamels, varnishes, etc., they find application in surface-protective coatings, such as for walls, desks, wire, concrete, porcelains, etc. In a flowable condition without the use of solvents they may be used as impregnants for many porous bodies, such as cork, pottery, felts, or fabricated bodies with interstices, such as the windings of electrical coils, netted fiber, interwoven fibrous materials, etc.

From the foregoing description it will be seen that the present invention provides a method of producing new synthetic compositions which comprises polymerizing a polymerizable composition comprising (1) a methylene malonic ester, more particularly an ester corresponding to the general formula

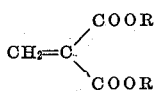

where R represents an aliphatic or aromatic hydrocarbon radical, (2) a polymerizable unsaturated alkyd resin, and (3) a catalyst for accelerating the copolymerization of the materials of (1) and (2).

The new synthetic compositions of this invention may be described as being compositions comprising the product of polymerization of a polymerizable mixture including (1) a methylene malonic ester, e. g., a methylene dialkyl malonate, a methylene diaryl malonate, and (2) an unsaturated alkyd resin, more particularly an unsaturated alkyd resin obtained by reaction of ingredients comprising a polyhydric alcohol, e. g., a dihydric alcohol, and an alpha unsaturated alpha beta polycarboxylic acid, e. g., an alpha unsaturated alpha beta dicarboxylic acid, the materials of (1) and (2) being copolymerizable. Specific embodiments of the invention include compositions comprising the product of polymerization of a polymerizable mixture of copolymerizable materials including (1) a methylene malonic ester, e. g., a methylene dialkyl malonate such, for instance, as methylene dimethyl malonate, methylene diethyl malonate, methylene dipropyl malonate, etc., and (2) a maleic, fumaric or itaconic ester of a polyhydric alcohol, more particularly a maleic, fumaric or itaconic diester of a dihydric alcohol. Also included within the scope of the present invention are compositions comprising the product obtained by copolymerization of ingredients comprising a glycol maleate, fumarate or itaconate, e. g., diethylene glycol maleate, while the said ingredients are admixed with a small amount of a polymerization catalyst, e. g., an organic peroxide. The products of the invention also include compositions of matter comprising an interpolymer of (1) a methylene malonic ester, more particularly a methylene malonic ester of an alcohol having at least three carbon atoms, e. g., methylene dipropyl malonate, methylene dibutyl malonate, etc., and (2) at least one polyhydric alcohol ester of an alpha unsaturated alpha beta polycarboxylic acid, e. g., a polyhydric alcohol ester of maleic, fumaric or itaconic acid.

What I claim as new and desire to secure by Letters Patent of the United States is:

1. A polymerizable composition comprising (1) a methylene malonic ester, (2) a polymerizable unsaturated alkyd resin, and (3) a catalyst for accelerating the copolymerization of the materials of (1) and (2).

2. A composition comprising an interpolymer of ingredients including a methylene malonic ester and an unsaturated alkyd resin, said materials being copolymerizable.

3. A composition containing an interpolymer of ingredients including (1) a methylene dialkyl malonate and (2) an unsaturated alkyd resin obtained by reaction of ingredients comprising a polyhydric alcohol and an alpha unsaturated alpha beta polycarboxylic acid, said materials of (1) and (2) being copolymerizable.

4. A composition comprising an interpolymer of ingredients including (1) a methylene malonic ester and (2) an unsaturated alkyd resin obtained by reaction of ingredients comprising a dihydric alcohol and an alpha unsaturated alpha beta dicarboxylic acid, said materials of (1) and (2) being copolymerizable.

5. A composition comprising an interpolymer of ingredients including (1) a methylene malonic ester and (2) a maleic ester of a polyhydric alcohol, said materials of (1) and (2) being copolymerizable.

6. A composition comprising an interpolymer of ingredients including (1) a methylene malonic ester and (2) a fumaric ester of a polyhydric alcohol, said materials of (1) and (2) being copolymerizable.

7. A composition comprising an interpolymer of ingredients including (1) a methylene malonic ester and (2) an itaconic ester of a polyhydric alcohol, said materials of (1) and (2) being copolymerizable.

8. A composition containing an interpolymer of copolymerizable materials including a maleic diester of a dihydric alcohol and a methylene dialkyl malonate.

9. A composition containing an interpolymer of copolymerizable materials including a fumaric diester of a dihydric alcohol and a methylene dialkyl malonate.

10. A composition containing an interpolymer of copolymerizable materials including an itaconic diester of a dihydric alcohol and a methylene dialkyl malonate.

11. A composition of matter comprising an interpolymer of ingredients including (1) a methylene malonic ester and (2) a maleic diester of a glycol, said materials of (1) and (2) being copolymerizable.

12. A composition of matter comprising an interpolymer of methylene dimethyl malonate and an unsaturated alkyd resin copolymerizable therewith.

13. A composition of matter comprising an interpolymer of methylene diethyl malonate and an unsaturated alkyd resin copolymerizable therewith.

14. A composition of matter comprising an interpolymer of ingredients including (1) a methylene malonic ester of an alcohol having at least three carbon atoms and (2) a polyhydric alcohol ester of an alpha unsaturated alpha beta polycarboxylic acid, said materials of (1) and (2) being copolymerizable.

15. A composition comprising an interpolymer of ingredients comprising a glycol maleate and a methylene dialkyl malonate copolymerizable therewith.

16. As a new product, an interpolymer of diethylene glycol maleate and a methylene dialkyl malonate copolymerizable therewith.

17. The method of producing new synthetic compositions which comprises polymerizing a polymerizable composition comprising (1) a methylene malonic ester, (2) a polymerizable unsaturated alkyd resin, and (3) a catalyst for accelerating the copolymerization of the materials of (1) and (2).

GAETANO F. D'ALELIO.